(12) United States Patent
Jeuffe et al.

(10) Patent No.: US 8,925,834 B2
(45) Date of Patent: Jan. 6, 2015

(54) CIRCUIT FOR DISPENSING WINDSHIELD WASHER FLUID FOR A MOTOR VEHICLE

(75) Inventors: Gérard Jeuffe, Bazemont (FR); Jacky Lefevre, Bagneux (FR); Brahim Hamza, Guilherand-Granges (FR); Akim Driss Bouguerra, Villeurbanne (FR); Geoffroy Meyer, Bourg-de-Peage (FR)

(73) Assignees: Peugeot Citroën Automobiles SA, Velizy Villacoublay (FR); MGI Coutier, Champfromier (FR)

( * ) Notice: Subject to any disclaimer, the term of this patent is extended or adjusted under 35 U.S.C. 154(b) by 0 days.

(21) Appl. No.: 13/990,317

(22) PCT Filed: Nov. 24, 2011

(86) PCT No.: PCT/FR2011/052750
§ 371 (c)(1),
(2), (4) Date: Jun. 27, 2013

(87) PCT Pub. No.: WO2012/072919
PCT Pub. Date: Jun. 7, 2012

(65) Prior Publication Data
US 2013/0292488 A1    Nov. 7, 2013

(30) Foreign Application Priority Data

Nov. 29, 2010  (FR) ...................................... 10 59856

(51) Int. Cl.
*B05B 1/24* (2006.01)
*B60S 1/48* (2006.01)

(52) U.S. Cl.
CPC ... *B60S 1/481* (2013.01); *B60S 1/48* (2013.01)
USPC .......................................... 239/127; 239/124

(58) Field of Classification Search
CPC ............... B60S 1/46; B60S 1/48; B60S 1/481
USPC ............ 137/429, 433; 239/127, 284.1, 284.2
See application file for complete search history.

(56) References Cited

U.S. PATENT DOCUMENTS

| 5,662,138 | A  | * | 9/1997 | Wang ............................ 137/433 |
| 5,857,624 | A  | * | 1/1999 | Lee ............................ 239/284.1 |
| 6,695,004 | B1 | * | 2/2004 | Raybuck ....................... 137/433 |
| 6,886,588 | B2 | * | 5/2005 | Malenfant et al. ............ 137/399 |
| 2002/0133893 | A1 | * | 9/2002 | Hasegawa et al. ......... 15/250.04 |

FOREIGN PATENT DOCUMENTS

AU    2010100740 A4    8/2010
DE        2047815 A1    3/1972

(Continued)

OTHER PUBLICATIONS

International Search Report from corresponding International Application No. PCT/FR2011/052750 mailed Jan. 25, 2012.

*Primary Examiner* — Melanie Tyson
*Assistant Examiner* — Viet Le
(74) *Attorney, Agent, or Firm* — Polster, Lieder, Woodruff & Lucchesi, LC (57) ABSTRACT

The present invention relates to a circuit for dispensing windshield washer fluid for a motor vehicle. According to the invention, the dispensing circuit is characterized in that it includes a float (11) housed inside a chamber (12) of a stationary body (13) so as to occupy a top position enabling the flow of the windshield washer fluid toward the nozzles, and a bottom position in which the chamber (12) is inoperative, an in which the float blocks the flow of the windshield washer fluid to the tank (2). The invention can be used in the automotive field.

15 Claims, 12 Drawing Sheets

(56) References Cited

FOREIGN PATENT DOCUMENTS

| | | | |
|---|---|---|---|
| DE | 2632755 | A1 | 1/1978 |
| DE | 3840621 | A1 | 6/1990 |
| GB | 764704 | A | 1/1957 |
| GB | 963951 | A | 7/1964 |
| WO | 2007052445 | A1 | 5/2007 |

* cited by examiner

CIRCUIT FOR DISPENSING WINDSHIELD WASHER FLUID FOR A MOTOR VEHICLE

CROSS-REFERENCE TO RELATED APPLICATIONS

The present application is the US national stage under 35 U.S.C. §371 of International Application No. PCT/FR2011/052750 having an international filing date of Nov. 24, 2011, which claims the priority of French application 1059856 filed on Nov. 29, 2010.

BACKGROUND

The present invention relates to a circuit for dispensing windshield washer fluid for a vehicle, such as a motor vehicle.

Conventionally, a circuit for dispensing windshield washer fluid includes a storage tank for windshield washer fluid which is placed in the engine compartment of the vehicle, or in a free space of the fender of the vehicle, a pump optionally built directly in the storage tank, and a tube connecting the storage tank and the pump to the nozzles for spraying the windshield washer fluid onto the windshield of the vehicle or the glass lens of the vehicle's headlights, or to a nozzle for atomizing windshield washer fluid on the back window of the vehicle.

The nozzles are sometimes mounted on the support arms of the wiper blades or on the wiper blades themselves, and a portion of the tube is then located outside the vehicle.

Under these conditions, due to the fact that the nozzles and the outer portion of the feed tube supplying windshield washer fluid to the nozzles are not protected by the engine of the vehicle, the windshield washer fluid present in the nozzles can freeze in cold weather and due to the aerodynamic effect of the forward movement of the vehicle, making the nozzles unusable.

A simple solution to prevent the freezing of the windshield washer fluid in the nozzles and in the outer tube portion consists in completely purging the circuit for dispensing windshield washer fluid by returning it into the tank.

However, the disadvantage of this solution is that it increases the response time of the window washing function, especially when the tank and the pump are installed far from the nozzles.

The document DE 3840621 describes a circuit for dispensing windshield washer fluid comprising a valve making it possible to direct the windshield washer fluid to at least one nozzle when a feed pump supplying windshield washer fluid is activated, and allowing the windshield wiper fluid standing in a portion of the tube located outside, between the nozzle and the valve, to be discharged into the storage tank for windshield wiper fluid when the pump is stopped in order to prevent the fluid from freezing in cold weather. The valve consists of a movable part that occupies a different position depending on the pressure of the windshield wiper fluid, thus opening specific passages in order to make it possible to supply the nozzle with windshield washer fluid or to discharge the windshield washer fluid contained in the outer tube portion connected to the nozzle.

However, the design of such a valve is fairly complex and costly.

SUMMARY

The purpose of the present invention is to overcome the above disadvantages of the known circuits for dispensing windshield washer fluid.

For this purpose, a circuit for dispensing windshield washer fluid for a vehicle, such as a motor vehicle, includes at least one nozzle, a valve assembly arranged in a tube connecting the nozzle to a tank for windshield washer fluid and a washing fluid feed pump. The circuit makes it possible to direct the windshield washer fluid to the nozzle when the pump is activated, and to return the windshield washer fluid present in a first tube section between the nozzle and the valve assembly to the tank when the pump is stopped. To enable this functionality, the valve assembly includes a float housed in a chamber of a stationary body communicating, on the one hand, with the first tube section connecting the valve assembly to the nozzle, and, on the other hand, with a second tube section connecting the valve assembly to the tank and to the pump. The float can occupy a top position in the chamber when the pump is activated to enable the passage of the windshield washer fluid from the second tube section to the first tube section through the chamber, and can drop with the level of windshield washer fluid in the chamber when the pump is stopped to enable the discharge of the windshield washer fluid in the first section to the second tube section through the chamber until the float occupies a bottom rest position in the chamber in which it obstructs or closes the passage of the windshield washer fluid to the second section and blocks a column of windshield washer fluid in this second section.

According to a first embodiment, the float comprises a needle-shaped float having an upper rod which enables guided sliding of the needle-shaped float relative to the stationary body between the float's top and bottom rest positions. A lower end of the float bears, in the bottom rest position of the needle-shaped float, against a sealing seat located at the bottom of the stationary body and communicating with the second tube section.

Advantageously, an annular sealing gasket is inserted between the lower end of the needle-shaped float and the sealing seat.

The annular sealing gasket is rigidly connected to the sealing seat or to the lower end of the needle-shaped float.

The lower end of the needle-shaped float and the sealing seat are frusto-conical.

According to a second embodiment, the float comprises a ball that bears with sealing contact, in its bottom rest position, against an annular sealing gasket rigidly connected to the bottom of the stationary body having an opening communicating with the second tube section.

According to a variation of this embodiment, the ball has an upper rod enabling the guided sliding of the ball relative to the stationary body between its top and bottom rest positions.

Advantageously, the float can be maintained in its bottom rest position by magnetization means.

According to an embodiment, the magnetization means includes a magnet housed in the float, and a metal part or another magnet rigidly connected to the stationary body near the magnet of the float in order to magnetically attract the magnet of the float toward the metal part of the other magnet.

According to another embodiment, the magnetization means includes a metal coating rigidly connected to the float, and a magnet rigidly connected to the stationary body near the metal coating in order to magnetically attract the float.

The float is made of a plastic material.

The float, in addition, has a density lower than that of the windshield washer fluid.

The nozzle is mounted on a windshield wiper of the vehicle, and at least a portion of the first tube section is located outside the engine hood of the vehicle.

The invention also relates to a vehicle, such as a motor vehicle, which is characterized in that it is provided with a circuit for dispensing windshield washer fluid as defined above.

DESCRIPTION OF THE FIGURES

The invention will be better understood, and other purposes, characteristics, details and advantages thereof will become clearer in the following description made in reference to the appended drawings, which are given solely as examples illustrating several embodiments, and in which.

DETAILED DESCRIPTION

Figure 1:
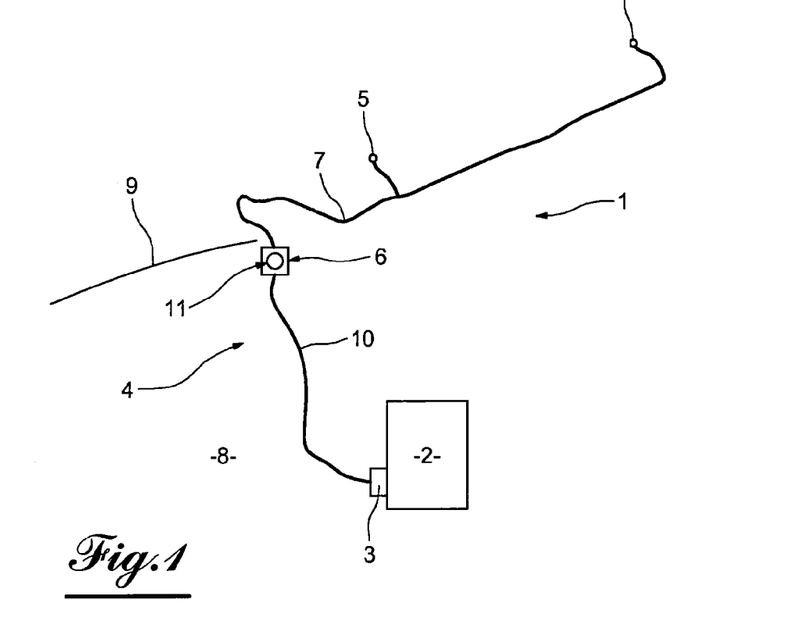
FIG. 1 is a is a schematic representation of a circuit for dispensing windshield washer fluid.

Referring first to FIG. 1, reference numeral 1 denotes a circuit for dispensing windshield washer fluid of a vehicle, the circuit 1 including a storage tank 2 for storing windshield washer fluid, a feed pump 3 for supplying windshield washer fluid, which can be built directly in the tank 2, a tube 4 connecting the pump 3 to two washing nozzles 5 for washing a window of the vehicle, in particular the front window of the vehicle. In this case, the two nozzles 5 can be mounted on the two pivoting support arms of the windshield wiper blades or on the wiper blades themselves, respectively. However, the two nozzles 5 can be mounted on two support arms of wiper blades for the glass lenses of the headlights of the vehicle, or on the wiper blades themselves, respectively. It is also possible to provide only a single nozzle mounted on a support arm of the wiper blade of the back window of the vehicle or on the wiper blade itself. A valve assembly 6 is located along the tube 4 and makes it possible to direct the windshield washer fluid to the nozzles 5 when the pump 3 is activated in order to clean the window and to lower or discharge the windshield washer fluid present or standing in a first upper section 7 of the tube 4, which is located between the nozzles 5 and the valve assembly 6, back into the tank 2 when the pump 3 is stopped.

According to the design of the dispensing circuit represented in FIG. 1, the tank 2 and the pump 3 are arranged in the bottom portion of the engine compartment 8 of the vehicle, which is closed by the hood 9, or they can be arranged in a free compartment of the fender of the vehicle.

The valve assembly 6 and the second section 10 of the tube 4 connecting the valve assembly to the pump 3 and to the tank 2 are also arranged in the engine compartment of the vehicle or under the scuttle/cowl grille, with it being possible for the assembly to be arranged substantially on the tank 2.

The first upper tube section 7 rigidly connected to the nozzles 5 is, for the most part, arranged outside the engine compartment 8 of the vehicle without being protected by the hood 9. Hence, the windshield washer fluid contained in the nozzles 5 and in the first upper section 7 can freeze in cold weather or due to the aerodynamic effect of the forward movement of the vehicle.

Figures 2, 3:
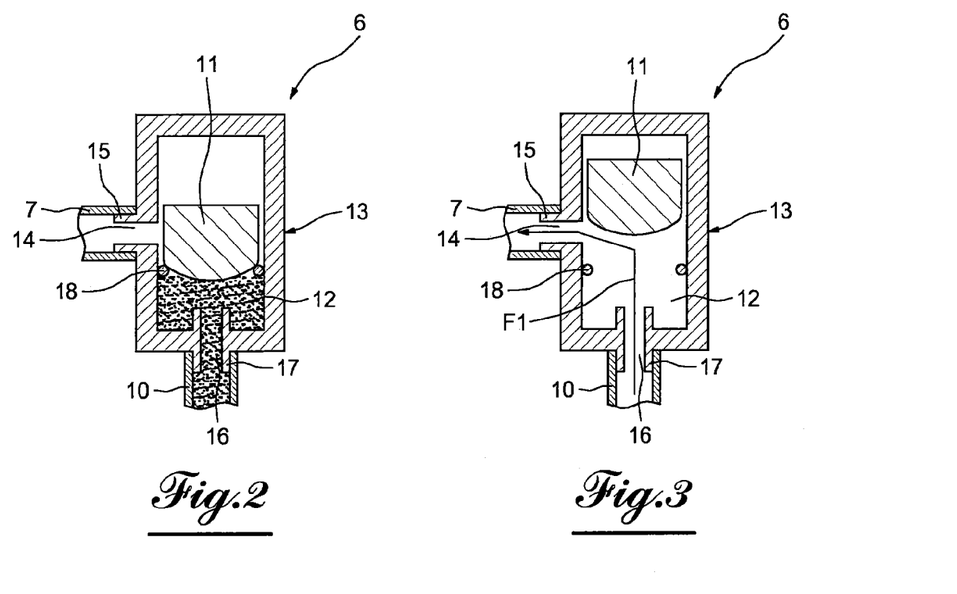
FIG. 2 is a diagrammatic representation in cross section of a valve assembly with a float located in the dispensing circuit of FIG. 1, and occupying a rest position.
FIG. 3 is a view similar to that of FIG. 2, representing the float in a top position for the passage of windshield washer fluid for supplying at least one washing nozzle.

As represented in FIGS. 2 and 3, the valve assembly 6 includes a float 11 housed in a chamber 12 of a body 13 forming a stationary casing in the engine compartment of the vehicle, or under the scuttle grille, the chamber or body extending vertically.

The chamber 12 communicates with the first tube section 7 through an opening 14 produced in the side wall of the body 13, substantially in the middle of the same, the opening 14 being extended on the outside by a pipe 15 of short length to which the corresponding end of the first section 7 is rigidly connected. The chamber 12 also communicates with the second tube section 10 through an opening 16 which is formed in the lower wall of the body 13 and extended on the outside by a pipe 17 of short length to which the corresponding end of the second section 10 is rigidly connected.

When the pump 3 is actuated by a command of the user of the vehicle, the windshield washer fluid under pressure penetrates into the chamber 12 through the lower opening 16 and moves the float 11 to its top position in the chamber 12 of the body 13, in which the windshield washer fluid is allowed to pass through the chamber 12 and the side opening 14, as represented symbolically by the arrow F1 in FIGS. 3 and 5, and to circulate subsequently in the first tube section 7, in order to supply windshield washer fluid to the nozzles 5 which spray the windshield washer fluid onto the window to be cleaned.

When the control unit of the pump 3 is no longer activated, the windshield washer fluid present in the first tube section 7 and in the chamber 12 below the float 11 descends back to the storage tank 2 through the second tube section 10, with a lowering of the float 11 as the level of fluid in the chamber 12 drops until the float 11 reaches a relatively low position as represented in FIG. 2, in which it rests as a result of gravity on a sealing seat, and is maintained on this seat by a "suction cup" effect due to the windshield washer fluid present in the portion of the chamber 12 below the float 11 and in the second tube section 10, so that the float 11 obstructs the passage of the windshield washer fluid in the section 10, and blocks the water column under the second tube section 10. In this manner, all the windshield washer fluid that was present in the first tube section 7 is discharged into the tank 2 through the valve assembly 6. Naturally, the float 11 must have a density lower than that of the windshield washer fluid, so as not to obstruct the return of the windshield washer fluid as soon as the pump 3 is stopped and enable the windshield washer fluid to return in part to the tank 2 after it has been discharged by gravity from the first tube section 7. The float 11 can have a density less than one.

As shown in FIGS. 2 and 3, the sealing seat of the float 11 comprises an annular sealing gasket 18 rigidly connected to the inner cylindrical surface of the body 13.

Preferably, the float 11 is made of a plastic material and can have the general shape of a piston which is axially guided in the body 13 and whose lower surface has a convexity turned toward the gasket 18.

By emptying the first tube section 7 of the windshield washer fluid, there is no longer any risk of the windshield washer fluid freezing in cold weather or due to the aerodynamic effect of the forward movement of the vehicle. Additionally, the blocking of the windshield washer fluid in the water column under the float 11 in the position represented in FIG. 2 makes it possible to preserve a relatively rapid response time for the window washing function as soon as the pump is activated again.

Figure 4:
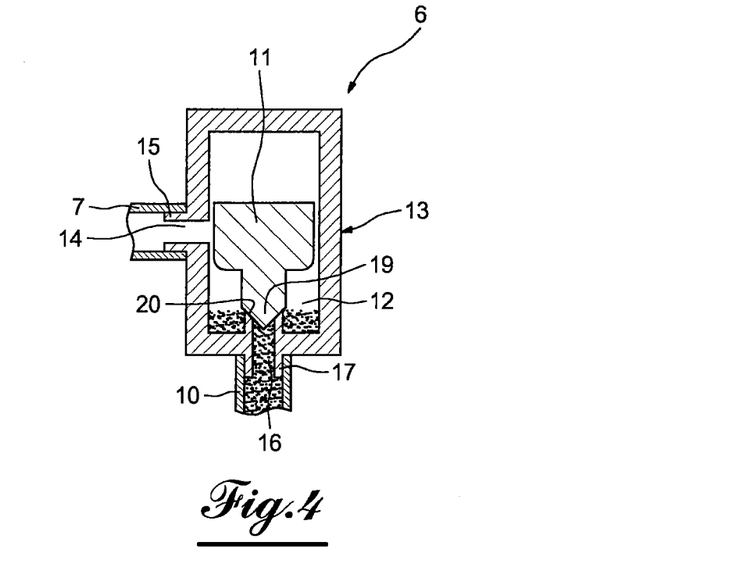
FIGS. 4 and 5 are diagrammatic representations in cross section of an embodiment of the valve assembly with a float.
Figure 5:
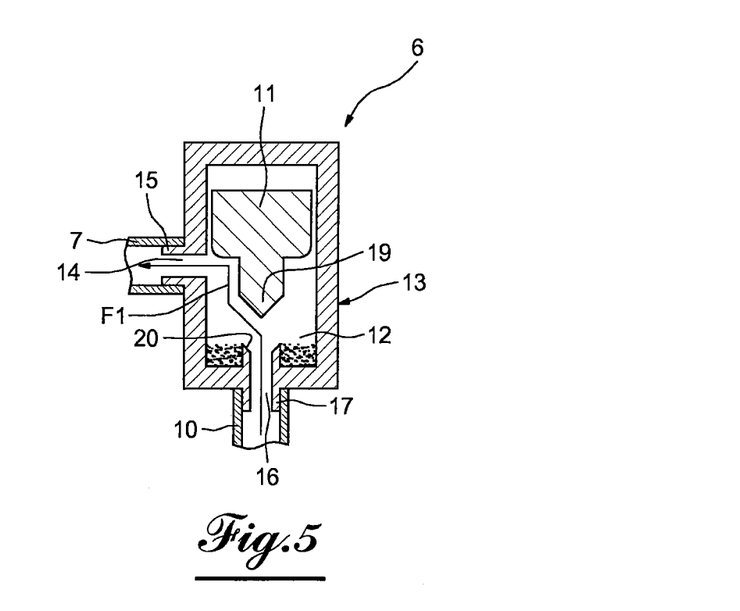

The embodiment represented diagrammatically in FIGS. 4 and 5 differs from that of FIGS. 2 and 3 only in general shape of the float, the float being in the form of a needle-shaped float whose conical lower end 19 bears with sealing contact against the complementarily-shaped seat 20 provided at the bottom of the body 13 when the float 11 occupies its bottom rest position for closing the passage of the windshield washer fluid to the tank 2, as shown in FIG. 4.

The functioning of the float 11 is identical to that of FIGS. 2 and 3, except that, once the windshield washer fluid has been discharged from the first tube section 7 to the tank 2, fluid remains at the bottom of the chamber 12 up to the seat 20, and a column of fluid remains in the second tube section 10 and under the conical end 19 of the float 11 so as to apply a suction cup effect pressing the conical end 19 of the float 11 onto the seat 20, as shown in FIG. 5. In general, residual fluid remains at the bottom of the chamber 12 when the float 11 occupies its top position for the passage of the windshield washer fluid to the nozzles 5, as shown in FIG. 5.

Like the float 11 of FIGS. 2, 3, the float of FIGS. 4, 5 can be made of a plastic material and it has a density less than that of the windshield washer fluid.

FIGS. 6-17 represent several embodiments of the needle-shaped float 11.

According to these embodiments, the body 13 in which the float 11 is housed comprises two portions including a generally cylindrical base body 21 in which the chamber 12 is defined and a cover 22 covering the base body 21 in order to close the chamber 12.

The cover 22 comprises two oblique upper pipes 15 located on both sides of the cover communicating with the chamber 12 respectively through two diametrically opposite openings 14 produced in the side wall 21a of the base body 21 and to which the ends of the two pipes forming the first tube section 7 are connected, respectively, each tube being connected to a nozzle 5.

The base body 21 includes a vertical lower pipe 17 to which the corresponding end of the second tube section 10 is connected and which communicates with the chamber 12.

An annular sealing gasket 21b is inserted between the side wall of the cover 22 and the side wall 21a of the base body 21, housed in a groove of the side wall 21a.

According to the embodiments of FIGS. 6-13, the needle-shaped float 11 includes an upper cylindrical rod 23 which is mounted so that it slides, guided between its upper position for supplying windshield washer fluid to the nozzles 5 and its bottom rest position for obstruction of the passage of this fluid to the tank 2, in a stationary sleeve 24 rigidly connected to the upper wall of the cover 22 and protruding into the chamber 12.

The frusto-conical lower end 19 of the needle-shaped float 11 bears, in the bottom rest position of the float, against a complementarily shaped sealing seat 20 communicating with the outer pipe 17 of the chamber 12.

According to the embodiment represented in FIGS. 6-9, the frusto-conical end 19 of the needle-shaped float 11 also bears with sealing contact, in its bottom rest position, against an annular sealing gasket 18 housed in an annular groove 21c formed in the frusto-conical seat 20 of the base body 21.

The functioning of the valve assembly 6 having a needle-shaped float 11 is the same as for the valve assembly described in reference to FIGS. 4 and 5, that is to say when the pump 3 is actuated by a command of the user, the windshield washer fluid under pressure raises the needle-shaped float 11 which is moved in a guided manner to the top until it abuts against the upper wall of the cover 22, and the frusto-conical lower end 19 is released from its seat 20 and from the sealing gasket 18, in order to allow the windshield washer fluid to circulate in the body 13 to the nozzles 5 through the pipes 15 and corresponding feed pipes (i.e., tubes 7) that supply the nozzles 5 with windshield washer fluid. When the command to activate the pump ceases, the windshield washer fluid present in the first tube section 7 descends back into the tank 2 through the body 13 in which the needle-shaped float 11 drops as the level of fluid in the chamber 12 drops, until the frusto-conical lower end 19 of the float 11 bears with sealing contact against its seat 20 and against the gasket 18 in such a manner as to obstruct the passage of the windshield washer fluid to the tank 2 and block the column of windshield washer fluid under the needle-shaped float 11 and in the second tube section 10, which column exerts a suctioning effect on the frusto-conical end 19, so as to maintain the conical end 19 bearing against the seat 20 and the gasket 18.

Figure 6:
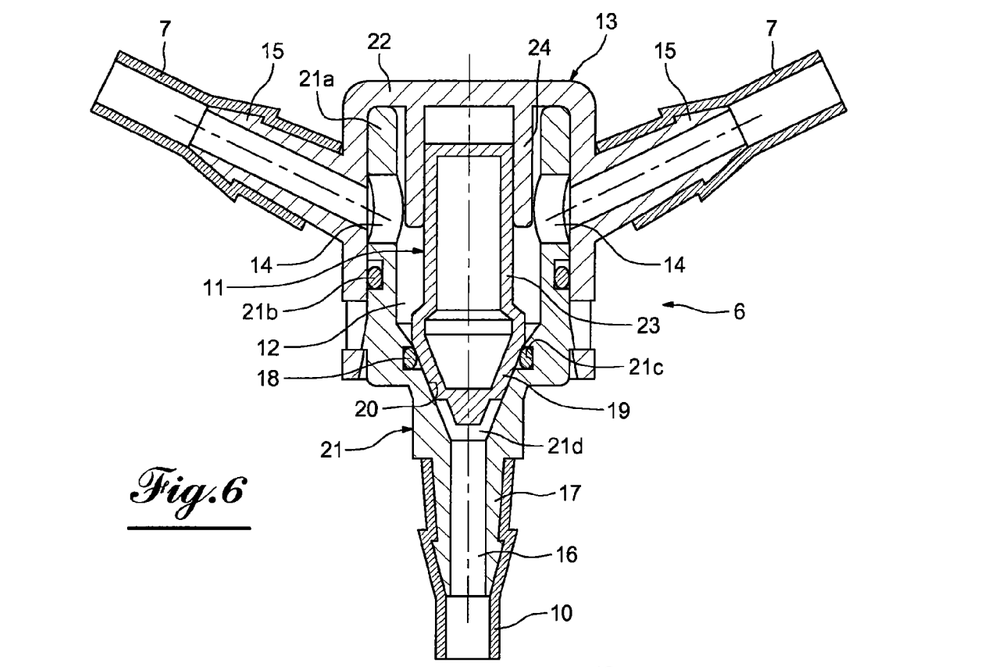
FIG. 6 represents a first embodiment of the float comprising a needle-shaped float occupying its bottom rest position with a sealing gasket located in the sealing seat of the needle-shaped float.
Figure 7:
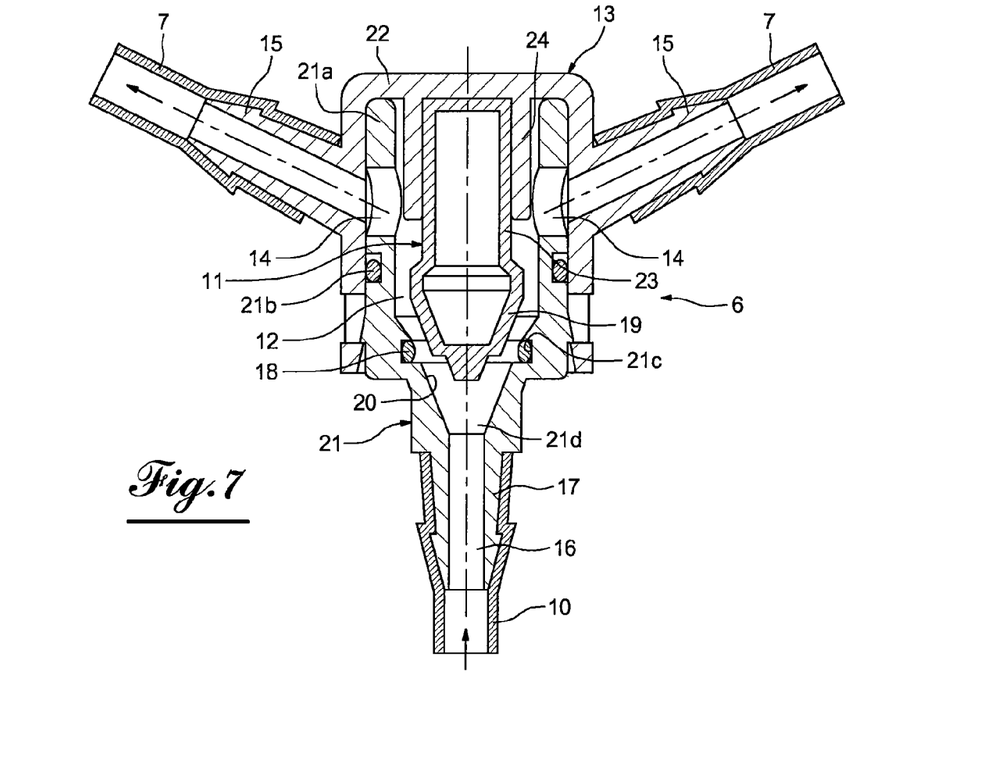
FIG. 7 is a view similar to that of FIG. 6, representing the needle-shaped float in its top position for the passage of windshield washer fluid for supplying the washing nozzles.
Figure 8:
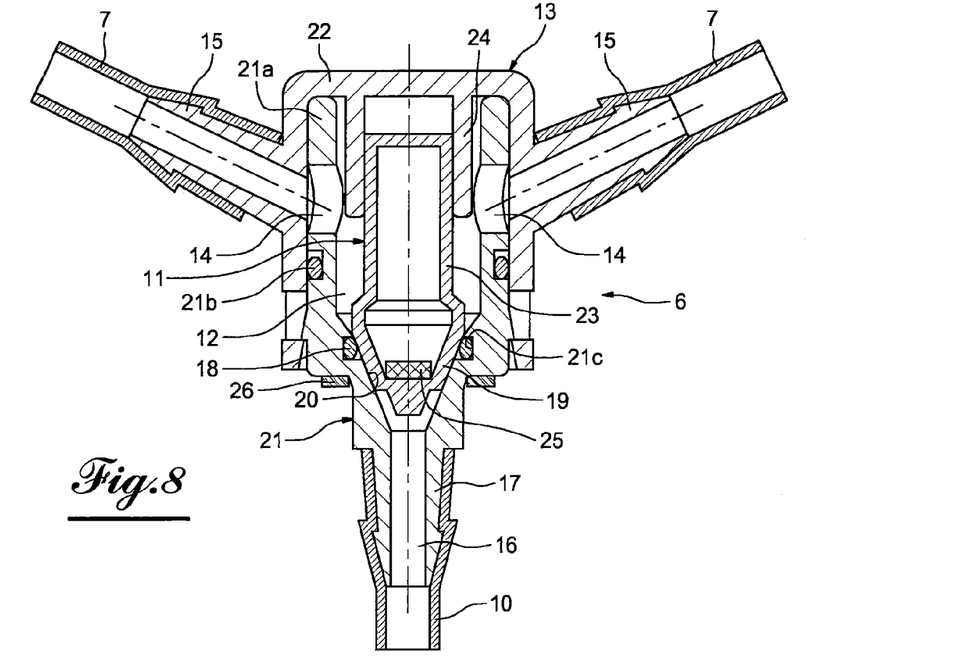
FIGS. 8 and 9 represent a variation of the embodiment of FIGS. 6 and 7, according to which magnetization means are provided in order to maintain the needle-shaped float in its bottom rest position.
Figure 9:
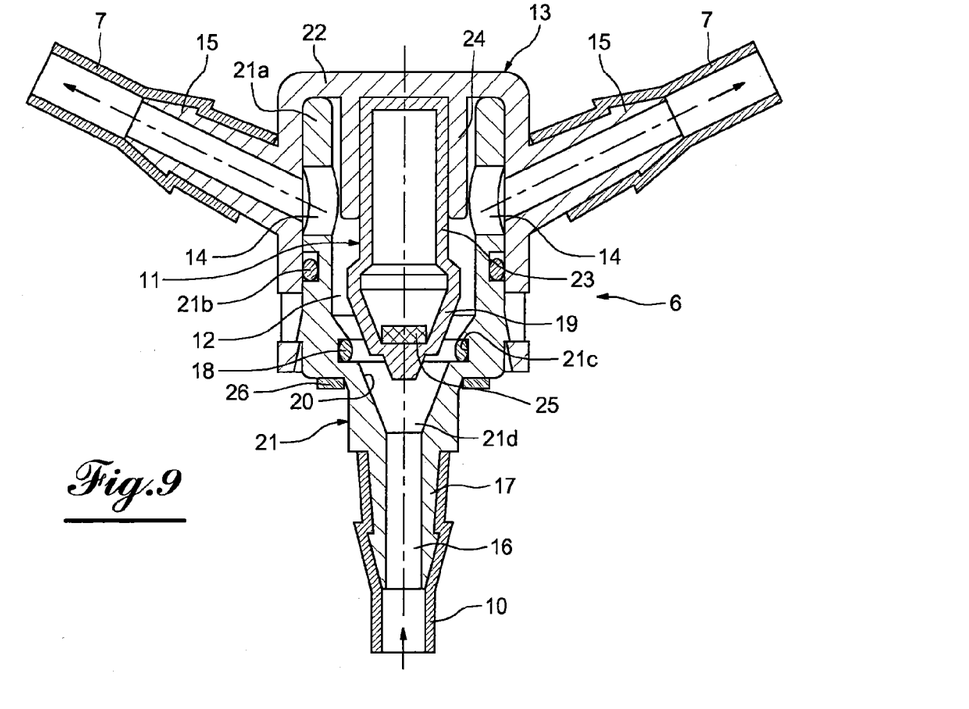

The embodiment of FIGS. 8 and 9, in comparison to that of FIGS. 6 and 7, comprises magnetization means that allow application of the frusto-conical lower end 19 of the needle-shaped float 11 against the sealing gasket 18 and against the seat 20 in the rest position of the float, in order to prevent a complete emptying of the dispensing circuit in case of vehicle vibrations capable of being applied to the float 11.

These magnetization means can include a magnet 25 housed in the frusto-conical lower end of the needle-shaped float 11 and a metal part 26 attached outside the base body 21 near the magnet 25 so that they attract each other mutually magnetically in a direction that makes it possible to apply the end frusto-conical 19 against the sealing gasket 18 and the seat 20.

The metal part 26 can be in the shape of an annular ring which is rigidly connected to the base body 21 coaxially with respect to the outer pipe 17.

As a variant, the magnetization means can comprise a magnet instead of the metal part 26, and a metal part instead of the magnet 25 or another magnet instead of the metal part 26 in addition to the magnet 25 present in the frusto-conical lower end 19 of the needle-shaped float 11.

According to another embodiment, the magnetization means can comprise a magnet instead of the metal part 26 and a metal layer coating the frusto-conical lower end 19 of the float 11, outside or inside.

Naturally, the force of magnetic attraction exerted by the magnetization means in order to maintain the frusto-conical lower end 19 of the float 11 with sealing contact against the gasket 18 and the seat 20 has to be less than the pressure of the windshield washer fluid exerted on the float 11 when the pump 3 is activated, so as to ensure under normal conditions the circulation of the windshield washer fluid to the nozzles 5, and this force of magnetic attraction must be negligible when the float 11 descends back to its seat 20 as soon as the pump 3 is stopped, in order to enable the windshield washer fluid present in the first tube section 7 to be discharged completely into the tank 2. This force of attraction intervenes only once the float 11 is in its rest position.

The embodiment of FIGS. 10-13 differ from the embodiment of FIGS. 6-9 only in the absence of a sealing gasket 18, so that the frusto-conical lower end 19 of the float 11 bears with sealing contact against its seat 20 only when the float 11 occupies its bottom rest position for obstruction of the passage of windshield washer fluid to the tank 2.

Figure 10:
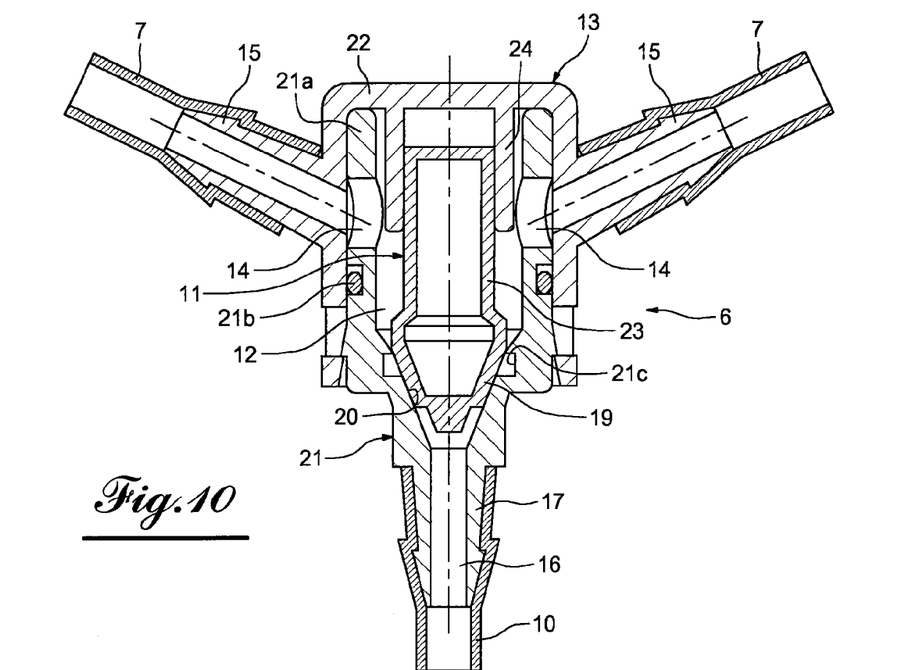
FIGS. 10 and 11 represent a variation of the embodiment of FIGS. 6 and 7, according to which no sealing gasket is provided between the needle-shaped float and its sealing seat.
Figure 11:
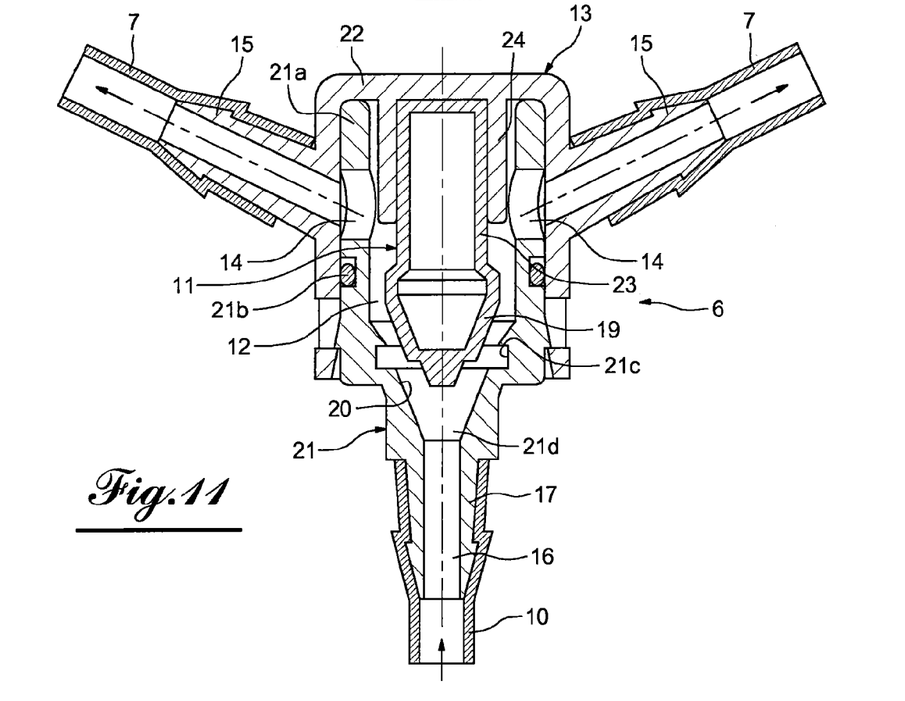
Figure 12:
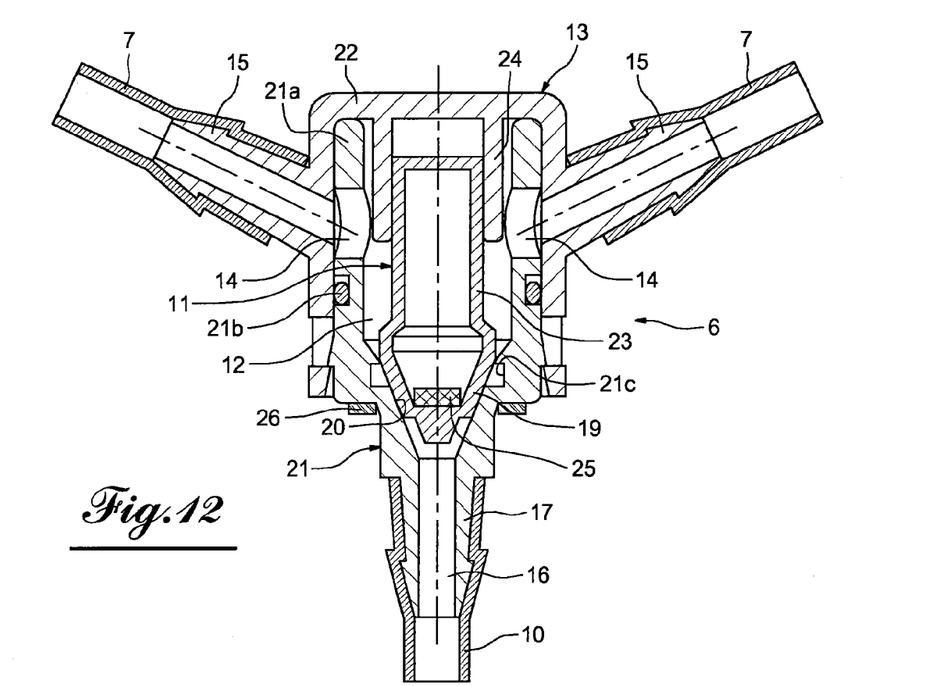
FIGS. 12 and 13 represent a variation of the embodiment of FIGS. 10 and 11, according to which magnetization means are provided in order to maintain the needle-shaped float in its bottom rest position.
Figure 13:
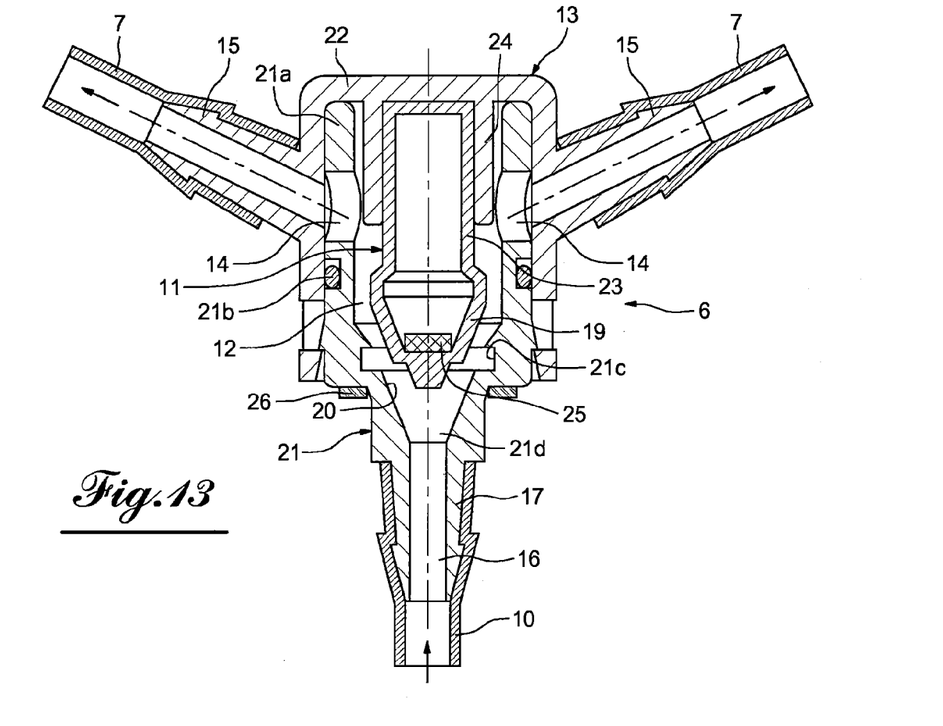

The embodiment of FIGS. 10 and 11 comprises no magnetization means making it possible to maintain the frusto-conical lower end of the float 11 on its sealing seat 20, while the embodiment of FIGS. 12 and 13 comprises such magnetization means whose embodiment variants have already been described in reference to FIGS. 8 and 9 and will thus not be described in detail again.

The embodiment represented in FIGS. 14-17 differs from that of FIGS. 6-13 in that the lower end 19 of the needle-shaped float 11 has a generally cylindrical shape, comprising an outer groove 19*a* in which the annular sealing gasket 18 is housed, and which bears with sealing contact against an inner annular seat 20 of the base body 21 when the float 11 occupies its bottom rest position. The sealing seat defines a central opening capable of communicating with the outer pipe 17 through a frusto-conical orifice 21*d* of the base body 21.

Figure 14:
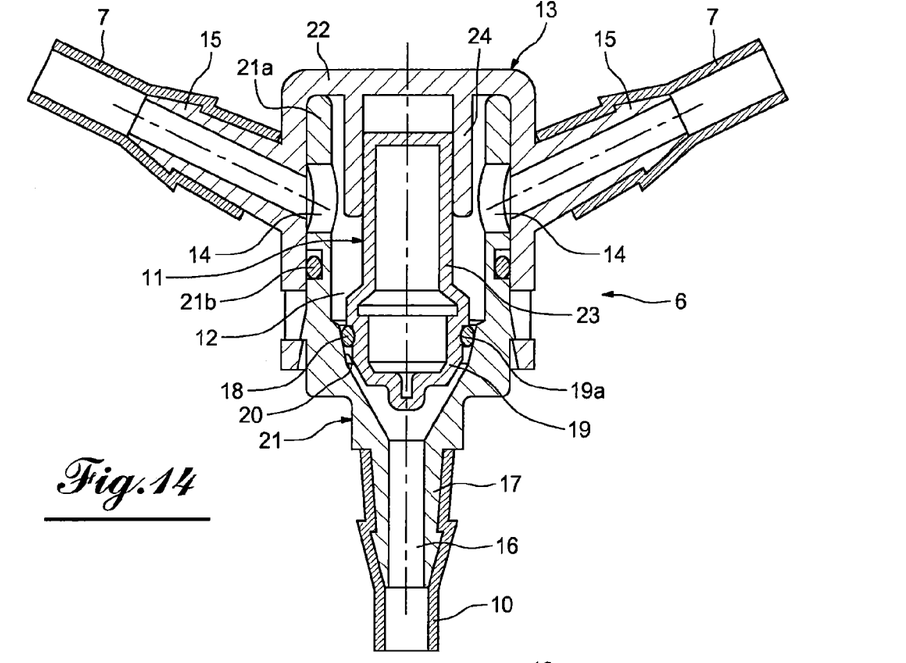
FIGS. 14 and 15 represent another embodiment of the needle-shaped float member provided with a sealing gasket occupying a bottom rest position and a top position for the passage of windshield washer fluid to the washing nozzles, respectively.
Figure 15:
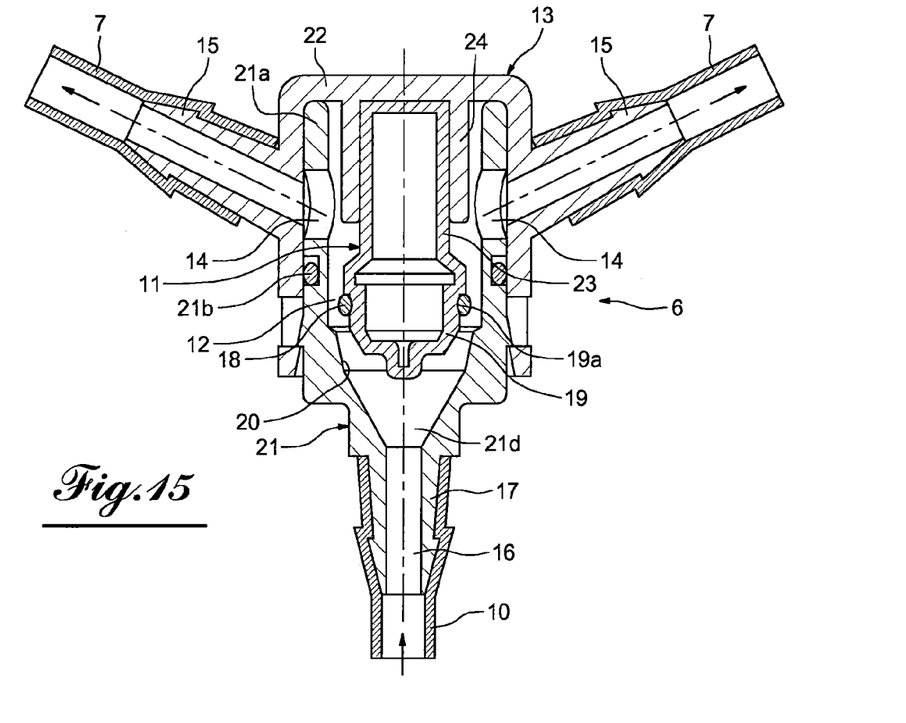
Figure 16:
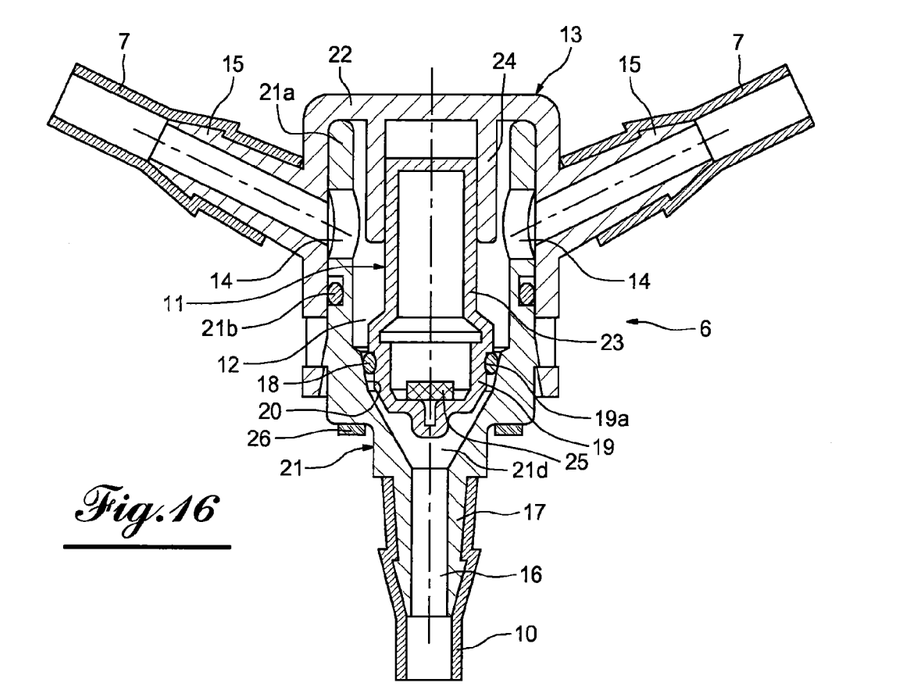
FIGS. 16 and 17 represent a variation of the embodiment of FIGS. 14 and 15, according to which magnetization means are provided in order to maintain the needle-shaped float in its bottom rest position.
Figure 17:
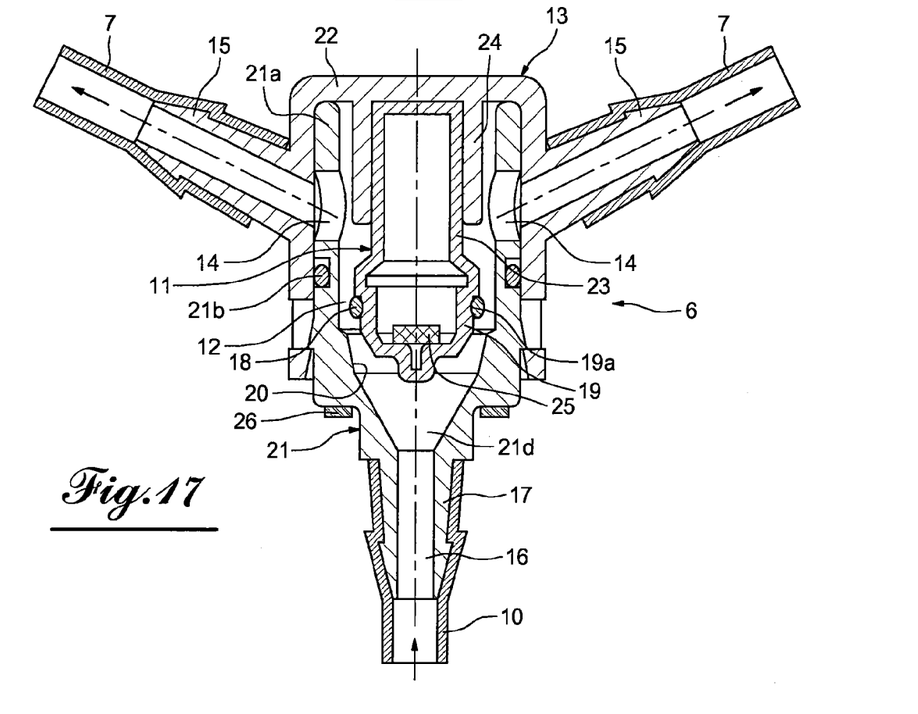

The embodiment of FIGS. 16 and 17 differs from that of FIGS. 14 and 15 in that it comprises magnetization means that make it possible to maintain the sealing gasket 18 of the lower cylindrical end of the float 11 in sealing contact against its seat 20 when the float occupies its bottom rest position. These magnetization means can have various embodiment variants as described in reference to FIGS. 8 and 9 and they will therefore not be described in detail again.

I The embodiment of FIGS. 14-17 functions in the same manner as the embodiment described in reference to FIGS. 6-13.

According to the embodiment represented in FIGS. 18-21, the float 11 includes at its lower end a generally spherical portion or a portion in the form of a ball 19 over which a cylindrical rod 23 hangs capable of sliding guided in the vertical direction in a stationary sleeve 24 of the cover 22, as in the various embodiments described in reference to FIGS. 6-17.

Figure 18:
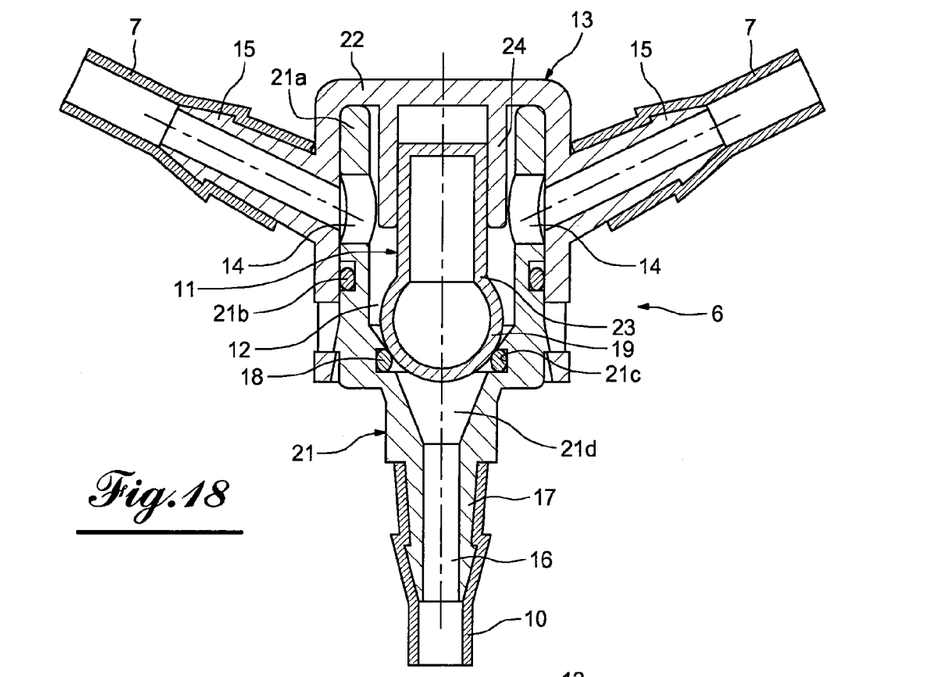
FIGS. 18 and 19 represent a second embodiment of the float comprising a guided ball occupying a bottom rest position bearing against a sealing gasket and a top position for the passage of windshield washer fluid to the nozzles, respectively.

As in the case in particular of FIGS. 6 and 7, an annular sealing gasket 18 is housed in a circular groove 21*c* produced in the frusto-conical opening 21*d* of the base body 21 in such a manner that the ball 19 of the float 11 bears with sealing contact against the gasket 18 when it occupies its bottom position for obstruction of the passage of the windshield washer fluid, represented in FIG. 18.

When the pump 3 is actuated by a command of the user, the pressure of the windshield washer fluid in the opening 21*d* raises the ball float 11 to a top position in order to disengage the ball from the sealing gasket 18 to allow the windshield washer fluid to flow out through the two pipes 15 of the cover 22 in order to supply the nozzles 5 with windshield washer fluid. When the command is no longer activated, the windshield washer fluid standing in the first tube section 7 descends again and returns to the tank 2. The ball float 11 descends in the chamber 12 as the level of fluid present in the chamber drops until the ball 19 of the float 11 bears with sealing contact against the gasket 18 in order to prevent the remaining windshield washer fluid from returning to the tank, and from being maintained in the water column under the ball 19 of the float 11, exerting on the ball 19*a* suctioning effect which maintains the ball in sealing contact on the gasket 18.

Figure 19:
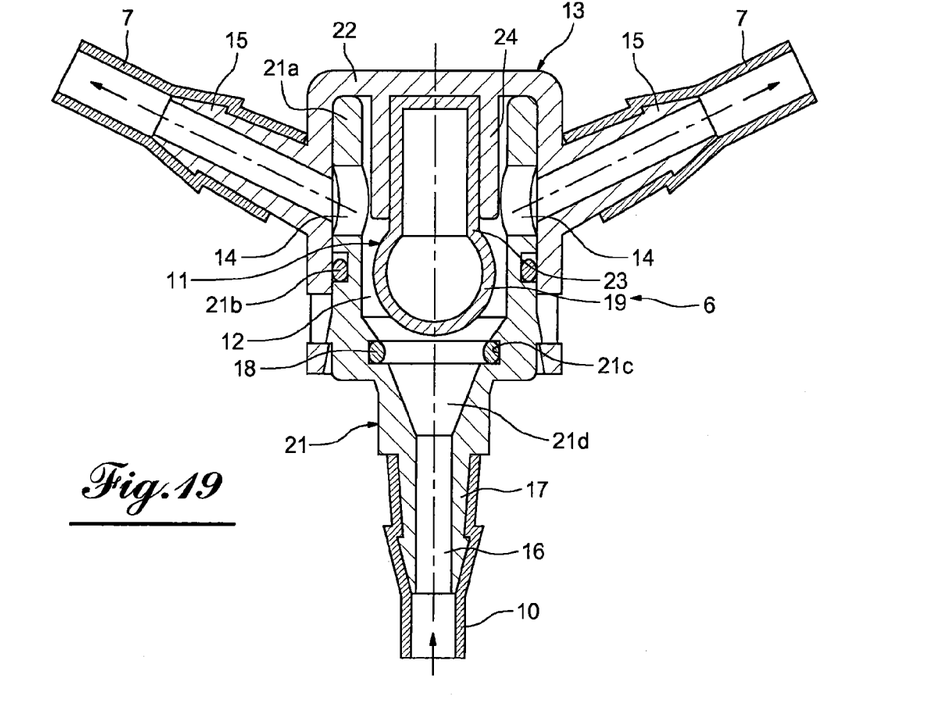
Figure 20:
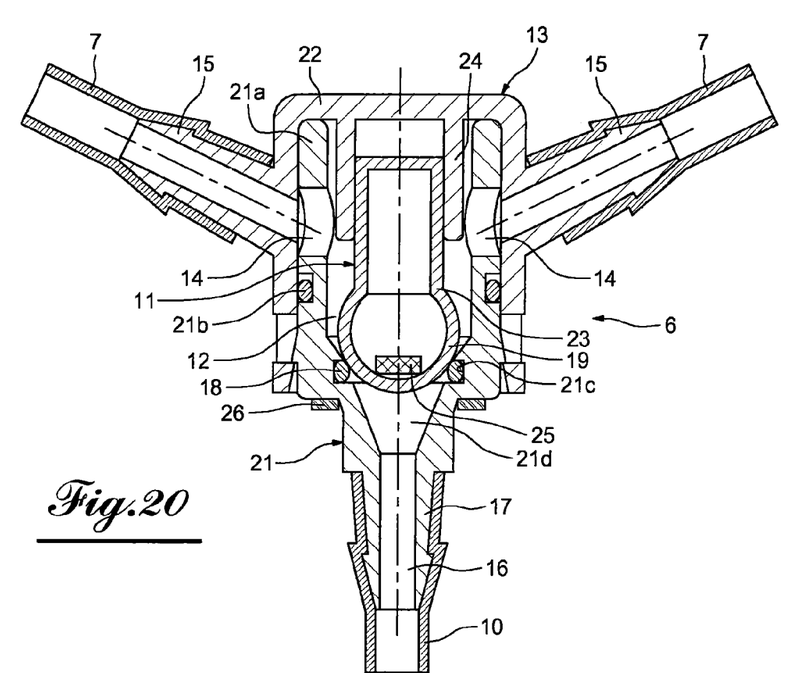
FIGS. 20 and 21 represent a variation of the embodiment of FIGS. 18 and 19, according to which magnetization means are provided in order to maintain the guided ball in its bottom rest position.
Figure 21:
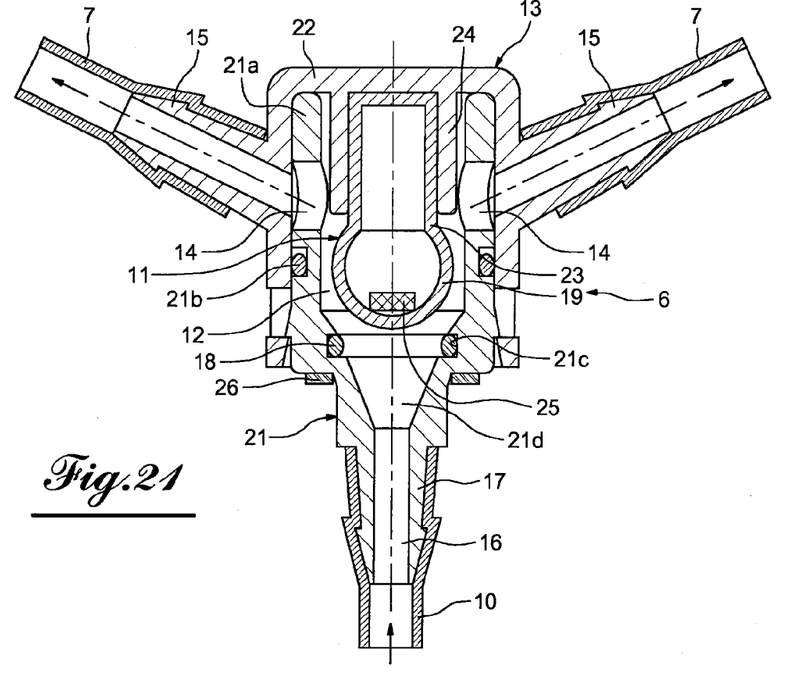

The embodiment of FIGS. 20 and 21 differs from that of FIGS. 18 and 19 only in the presence of magnetization means making it possible to maintain the ball 19 of the float 11 in sealing contact on the gasket 18 when it occupies its bottom rest position. These magnetization means have various embodiments already described in reference to FIGS. 8 and 9 and they will therefore not be described again, except to say that they make it possible for the ball 19 of the float 11 to be properly applied on the gasket 18 in its rest position, in order to prevent a complete emptying of the dispensing circuit in case of vehicle vibrations capable of being applied to the float 11.

According to the embodiment represented in FIGS. 22-25, the float 11 comprises only a ball held freely in the chamber 12, between its bottom position in sealing contact on an annular sealing gasket 18 installed in a circular groove 21*c* of the base body 21, as in the embodiment variants of FIGS. 18-21, and a top position abutting with the free end of the stationary sleeve 24 of the upper wall of the cover 22.

When the pump 3 is actuated by a control of the user, the pressure of the washing fluid penetrating into the chamber 12 raises the ball 11 to a top position until it abuts with the lower free end of the sleeve 24, in order to allow the windshield washer fluid to flow out through the two outer pipes 15 in order to supply the nozzles 5 with windshield washer fluid. When the command is no longer activated, the windshield washer fluid present in the first tube section 7 descends back to the tank 2, through the chamber 12 in which the ball 11 descends as the level of fluid in this chamber drops until the ball rests on the sealing gasket 18 so as to obstruct the passage of the windshield washer fluid, in order to prevent it from returning to the tank 2 and block the column of windshield washer fluid on the ball 11, exerting on the latter a suctioning effect which maintains it bearing against the sealing gasket 18.

Figure 22:
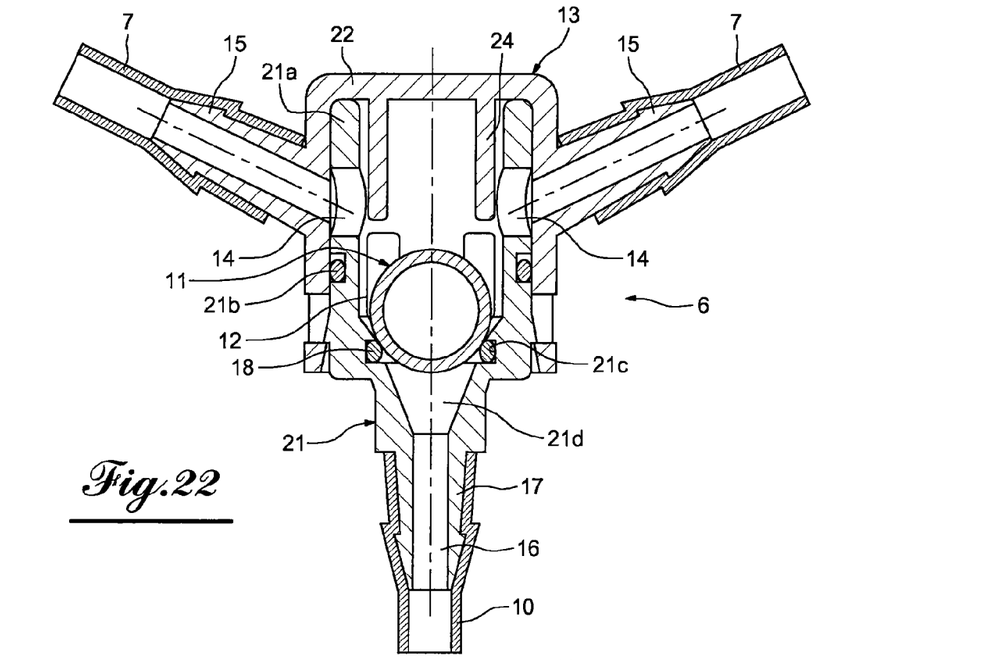
FIGS. 22 and 23 represent another embodiment of the float comprising a free ball occupying a bottom rest position bearing against a sealing gasket and a top position for the passage of windshield washer fluid to the nozzles, respectively.
Figure 23:
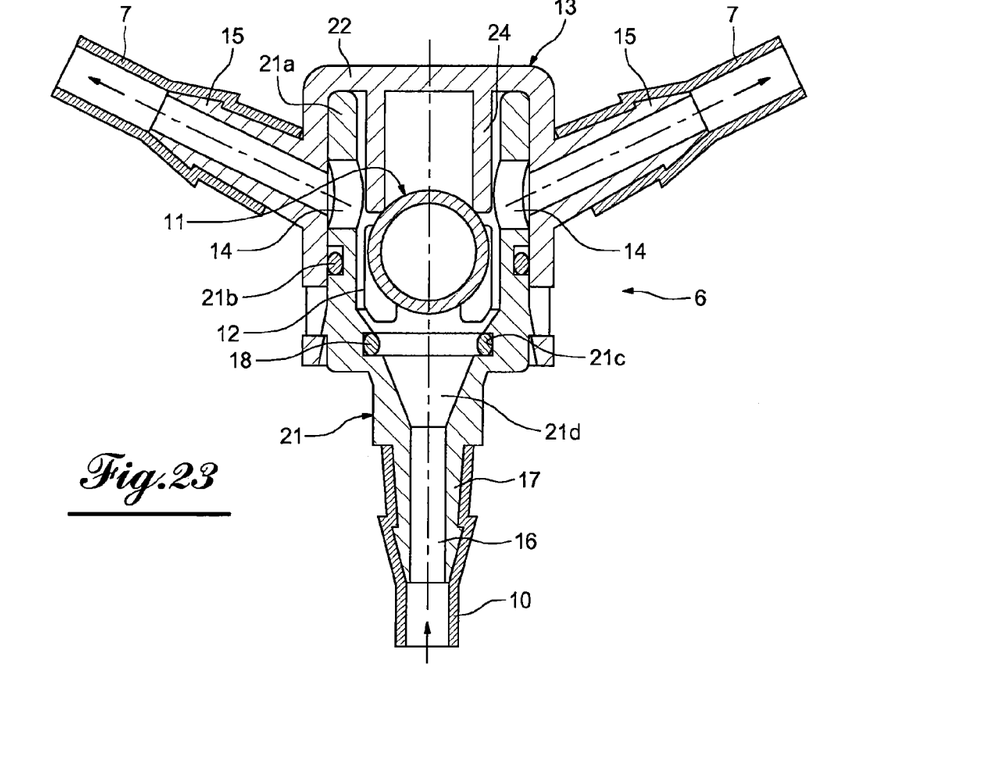
Figure 24:
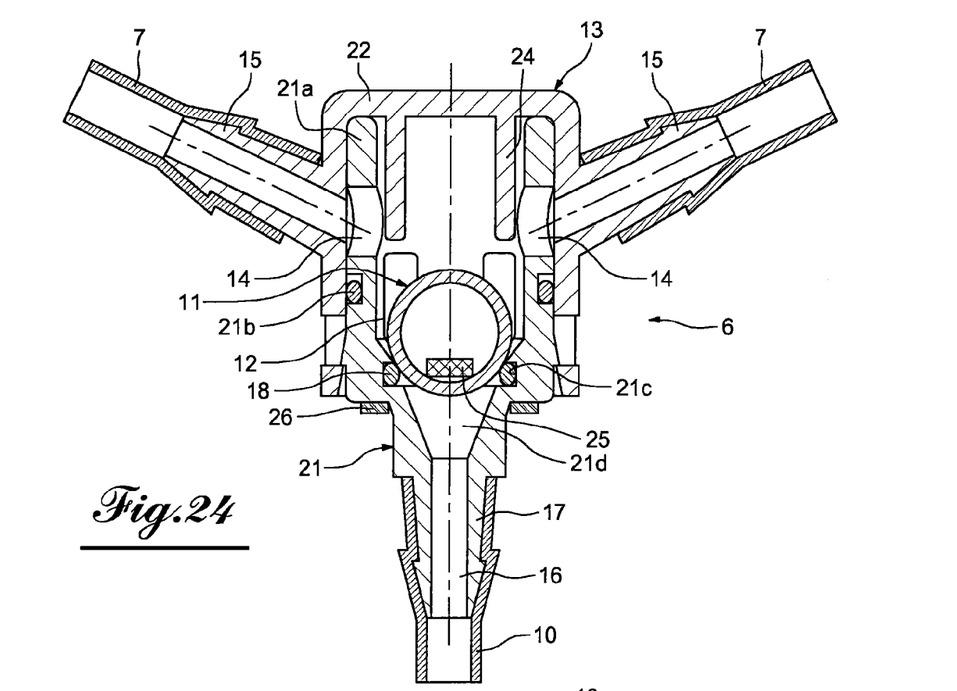
FIGS. 24 and 25 represent a variation of the embodiment of FIGS. 22 and 23, according to which magnetization means are provided in order to maintain the ball in its bottom rest position.
Figure 25:
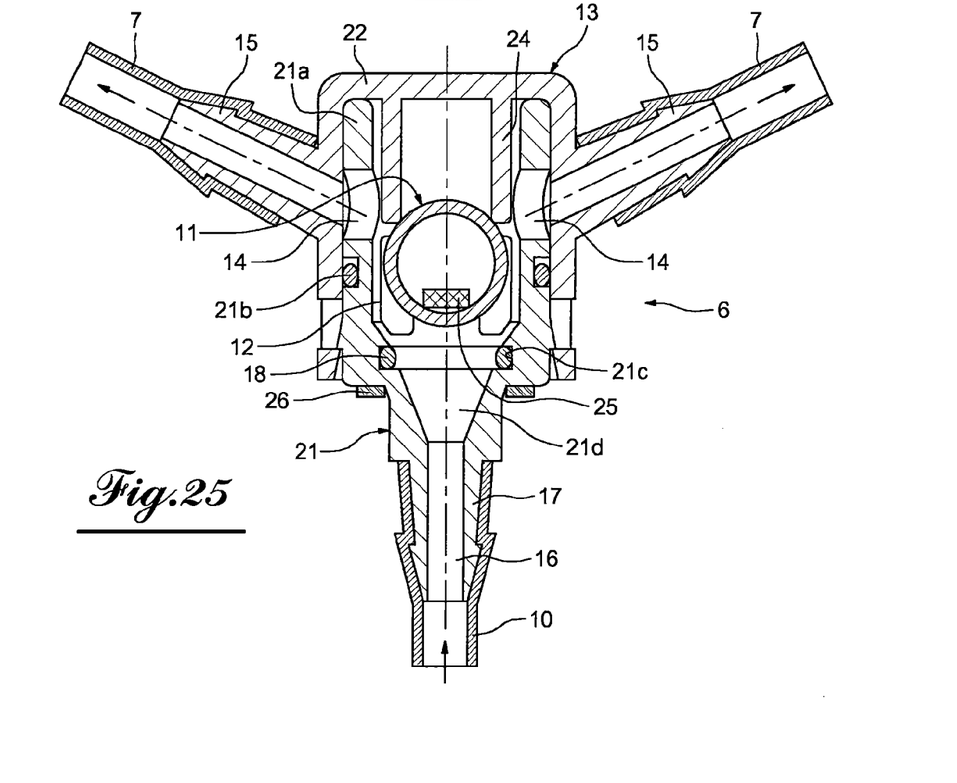

The embodiment of FIGS. 24 and 25 differs from that of FIGS. 22 and 23 in that it comprises magnetization means making it possible to apply the ball 11 against the sealing gasket 18 in its rest position and to prevent the complete emptying of the dispensing circuit in case of vehicle vibrations capable of being applied to the ball. These magnetization means can have various embodiments already described particularly in reference to FIGS. 8 and 9.

Regardless of the various embodiments described in reference to FIGS. 6-25, the float 11 can be made of a plastic material while being hollow on its inside, and, naturally, the density of the float 11 is less than the density of the windshield washer fluid.

The above-described dispensing circuit of the invention is a simple, effective, and inexpensive design aiming to prevent the windshield washing fluid present in the outer tube section 7 from freezing in cold weather and due to the aerodynamic effect of the forward movement of the vehicle. In addition, the design of this dispensing circuit is such that it does not increase the response time of the window washing function carried out by the nozzles and it prevents the complete draining of the entire dispensing circuit.

The invention claimed is:

1. A fluid dispensing circuit for dispensing windshield washer fluid for a vehicle; the fluid dispensing circuit including:
   at least one nozzle;
   a windshield washer fluid tank and a feed pump associated with the tank to pump washer fluid from the tank;
   a tube connecting the tank and feed pump to the at least one nozzle;
   a valve assembly positioned along said tube and dividing the tube into (1) a lower tube section extending between said valve assembly and said tank and feed pump and (2) an upper tube section extending between said valve assembly and said at least one nozzle;
   said valve assembly comprising a body defining a chamber having a bottom surface and a side wall extending upwardly from said bottom surface; a lower opening in said bottom surface to which said lower tube section is operatively connected such that said fluid tank is in fluid communication with said chamber, said lower opening defining both a windshield washer supply inlet and a chamber drain; at least one upper opening in said side wall of said body, said at least one upper opening being spaced above said lower opening and being operatively connected to said tube upper section such that said at least one nozzle is in fluid communication with said chamber; a float housed in said chamber and having a density less than a density of the windshield washer fluid, said float being movable between a lower position in which it sealingly engages said lower opening and an upper position in which said float is spaced from said lower opening; and a guide for guiding said float between its said lower and upper positions;
   whereby, when said pump is activated, said float is moved from its lower position to its upper position as fluid is pumped into said chamber such that fluid will flow through said chamber and out said upper opening to be dispensed through said at least one nozzle; and, when said pump is deactivated, washer fluid in said at least one nozzle, said upper tube section and said chamber drains through said lower opening to pass into said lower tube to return at least a portion of said windshield wiper fluid to said tank and, as the fluid drains, the float lowers with the level of fluid in the chamber from its said upper position to its said lower position, and when said float is in its said lower position, said nozzle and upper tube section are empty of fluid and said float seals said lower opening and generates a suction cup effect to prevent fluid in said lower tube section from draining into said tank, such that said circuit maintains a column of fluid in said lower tube section when said pump is not activated.

2. The dispensing circuit according to claim 1, wherein the float comprises a needle-shaped float having a lower end and an upper rod extending upwardly from said lower end, said upper rod allowing for guided sliding of the needle-shaped float relative to the body between the top position and the lower position, and when the float is in said lower position, the lower end of the float bears against a sealing seat located at a bottom of the body; said lower opening of said chamber being positioned at said bottom of the body.

3. The dispensing circuit according to claim 2, wherein an annular sealing gasket is inserted between the lower end of the needle-shaped float and the sealing seat.

4. The dispensing circuit according to claim 3, wherein the annular sealing gasket is rigidly connected to one of the sealing seat and the lower end of the needle-shaped float.

5. The dispensing circuit according to claim 2, wherein the lower end of the needle-shaped float and the sealing seat are frusto-conical.

6. The dispensing circuit according to claim 1, wherein the float comprises a ball and said body comprises an annular sealing gasket rigidly connected to the bottom of the body, wherein, when the float is in the lower position, the ball bears with sealing contact against the sealing gasket.

7. The dispensing circuit according to claim 6, wherein the ball has an upper rod extending from an upper surface thereof, said upper rod moving with said ball and enabling guided sliding of the ball relative to the body.

8. The dispensing circuit according to claim 1, wherein the float is maintained in its lower position by magnetization means.

9. The dispensing circuit according to claim 8, wherein the magnetization means includes a magnet in the float and a metal part or another magnet rigidly connected to the body near the magnet of the float in order to magnetically attract the magnet of the float to the metal part or the other magnet on the body.

10. The dispensing circuit according to claim 8, wherein the magnetization means includes a metal coating on the float and a magnet rigidly connected to the body near the metal coating of the float in order to magnetically attract the float.

11. The dispensing circuit according to claim 1, wherein the float is made out of a plastic material.

12. The dispensing circuit according to claim 1, wherein the nozzle is mounted on a windshield wiper of the vehicle, and at least a portion of the upper tube section is located outside an engine hood of the vehicle.

13. The dispensing circuit according to claim 1, wherein the float has a density less than a density of the windshield washer fluid.

14. A vehicle provided with the dispensing circuit windshield washer fluid of claim 1.

15. The dispensing circuit according to claim 1 wherein said valve assembly is spaced from said at least one nozzle.

* * * * *